United States Patent [19]

Lapera et al.

[11] 4,055,279

[45] Oct. 25, 1977

[54] LIQUID DISPENSER FOR A MOTOR VEHICLE

[76] Inventors: Dominic J. Lapera; Joseph Lapera, both of 1801 Maplewood Drive, Lindenhurst, Ill. 60046

[21] Appl. No.: 622,756

[22] Filed: Oct. 15, 1975

[51] Int. Cl.² ............................................. B67D 5/62
[52] U.S. Cl. ................................ 222/54; 222/146 H; 222/626; 137/354; 237/12.3 B; 141/82
[58] Field of Search ............................. 222/54, 65–66, 222/146 H, 146 HS, 146 HE, 178; 219/208; 137/351, 352–353, 354; 141/82; 123/41.31; 165/51; 417/32; 237/12.3 B

[56] References Cited

U.S. PATENT DOCUMENTS

| | | | |
|---|---|---|---|
| 2,485,246 | 10/1949 | Swanson | 222/54 X |
| 2,661,015 | 12/1953 | Allred et al. | 237/12.3 B X |
| 2,830,613 | 4/1958 | Mason | 137/353 |
| 2,975,347 | 3/1961 | Schaefer | 417/32 X |
| 3,276,634 | 10/1966 | Arnot | 237/12.3 B X |
| 3,521,704 | 7/1970 | Bridegum | 237/12.3 B |
| 3,645,327 | 2/1972 | Henley | 237/12.3 B X |
| 3,669,314 | 6/1972 | Goings | 222/146 H X |

*Primary Examiner*—Robert B. Reeves
*Assistant Examiner*—Charles A. Marmor
*Attorney, Agent, or Firm*—Richard G. Lione; John J. Pavlak

[57] ABSTRACT

A liquid heating and dispensing device is disclosed which includes a housing, a liquid storage tank located within the housing, a heating coil located within the storage tank, an electrical pump located within the housing for dispensing the hot liquid contained in the storage tank, and a thermal sensor to automatically determine when the liquid in the storage tank has reached a preset, minimum acceptable dispensing temperature. Also disclosed is a thermal sensor switch and related circuit to connect the thermal sensor to the pump to keep the liquid in the tank from being dispensed unless it is at or above the minimum dispensing temperature.

5 Claims, 5 Drawing Figures

LIQUID DISPENSER FOR A MOTOR VEHICLE

BACKGROUND OF THE INVENTION

This invention relates to a liquid or beverage dispensing device which is intended for use in a motor vehicle.

Numerous attempts have heretofore been made to produce a liquid dispenser for a motor vehicle which is capable of preparing a hot beverage, a cold beverage, or both. Most of these devices include a number of impractical features which adversely affect the cost, safety or versatility of the dispenser.

Many of these devices provided for the installation of the liquid storage tank in the engine compartment rather than in the passenger compartment. In addition to the sanitary considerations associated with such an installation, there is the problem that the liquid in the line from the tank to the dispensing head cools and must therefore generally be constantly recirculated to maintain adequate temperature.

Many liquid dispensers utilize a vacuum pumping system operating in conjunction with the vehicle's engine. This requires complex, costly valving systems and raises the possibility that an engine back-fire would be directed into the passenger compartment.

Other liquid dispensers heat the liquid with gases from the engine exhaust manifold. This is a difficult source of heat to deal with and the gas-liquid heat exchanger creates many problems due to the high temperature differential involved and the toxicity of the gases.

Another approach which has been frequently taken heretofore involves heating the liquid in the storage tank by electrical power obtained from the vehicle's electrical system. This approach severely limits the amount of water which can be heated, especially in a short time period.

Another drawback of the motor vehicle liquid dispensing devices used heretofore is the absence of automatic means of notifying the occupant of the vehicle that the liquid has reached the proper dispensing temperature and also of preventing the operation of the dispensing means until the liquid has reached that temperature. The absence of such features means that the vehicle's occupant cannot know whether the liquid has been properly heated until after it is in his cup.

The devices used heretofore have also failed to provide means to prevent the liquid from falling below a level that would expose the heating element located in the liquid storage tank. Without such a preventive means, there is a high probability of oxidation of the heating element which would shorten the useful life of the liquid dispensing device and add undesirable contaminants to the liquid supply.

SUMMARY OF THE INVENTION

This invention relates to a liquid heating and dispensing device for use in motor vehicles. Water is the liquid primarily intended to be used in this dispenser. The dispenser includes a housing, a liquid storage tank located within the housing, a heating means located within the storage tank, an electrical pump located within the housing for dispensing the hot liquid contained in the storage tank, and a thermal sensor to automatically determine when the liquid in the storage tank has reached the preset, minimum acceptable dispensing temperature. Preferably, the thermal sensor is connected to the electrical circuit powering the pump to keep the liquid in the tank from being dispensed unless it is at or above this minimum dispensing temperature.

Advantageously, the vehicle's cooling system is used as a heat source for the heating means and the heating means includes a heating coil, or piece of hollow tubing, which is connected to the vehicle's engine cooling system so that a portion of the engine's coolant can be passed through the coil to heat the liquid contained in the storage tank.

In a preferred embodiment of this invention, a single thermal sensor is provided just above the level of the heating coil in the storage tank and is connected to a thermal switch included in the circuit providing current to the pump to automatically determine when the liquid has reached the proper dispensing temperature, to prevent liquid dispensing unless the liquid has reached the proper dispensing temperature.

Another preferred embodiment of this invention includes a shelf on which a cup can be placed, a courtesy light for illuminating the cup and a bracket which can be used to level the liquid dispenser when it is located on the transmission bell housing tunnel of an automobile or the like. Means for dispensing a cold liquid may also be provided as well as means for dispensing beverage-making ingredients for mixing with the liquid in order to produce a beverage such as coffee, tea, chocolate and the like.

One of the primary advantages of this invention is that a self-contained, sanitary, easy to operate device is provided for dispensing hot liquids in a motor vehicle. This liquid dispenser is very compact and relatively inexpensive to manufacture. This device can be conveniently mounted in the passenger compartment of the vehicle, advantageously over the transmission tunnel.

Among the other advantages of this invention is that the liquid cannot be dispensed until the proper water temperature has been reached and the vehicle's occupant notified that the liquid has reached the proper temperature. This eliminates the problem of obtaining lukewarm coffee, tea or the like and will improve customer acceptance of vehicle beverage dispensers.

A particularly important advantage of the single thermal sensor preferred embodiment is that a one-button operating circuit can be provided which will provide notice that the liquid in the tank has reached the minimum dispensing temperature and will dispense liquid from the storage tank only if the minimum dispensing temperature has been reached.

Additional features and advantages of this invention are described in, and will appear from, the description of the preferred embodiments which follow and the drawings to which reference is now made.

DESCRIPTION OF THE PREFERRED EMBODIMENTS

The hot liquid dispenser of this invention is intended for use in a motor vehicle such as an automobile, truck, van, bus, motor home, motorized camper, motor boat and the like. The liquid dispenser of this invention is particularly intended for use in the passenger compartment of an automobile, van or truck where it may advantageously be mounted on or immediately above the floor. When used in an automobile, the liquid dispenser can be conveniently located on top of the transmission tunnel.

Figure 1:
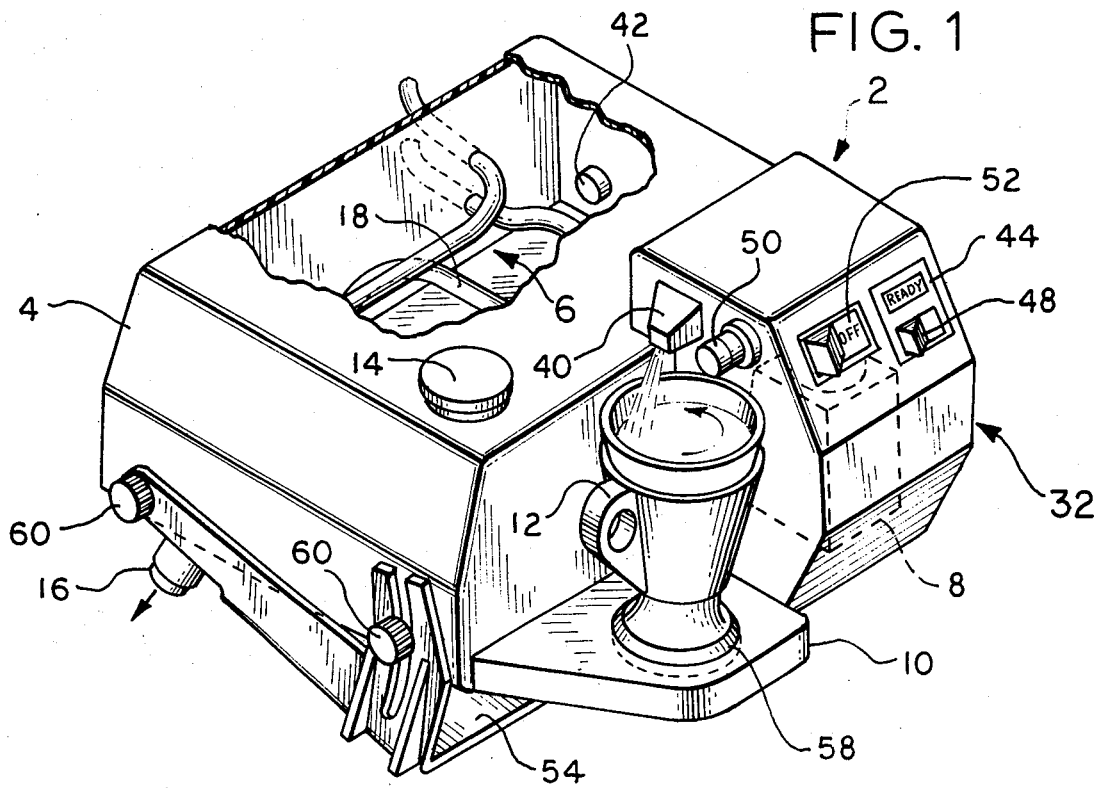
FIG. 1 is a perspective view of the vehicle liquid dispenser of this invention.
Figure 2:
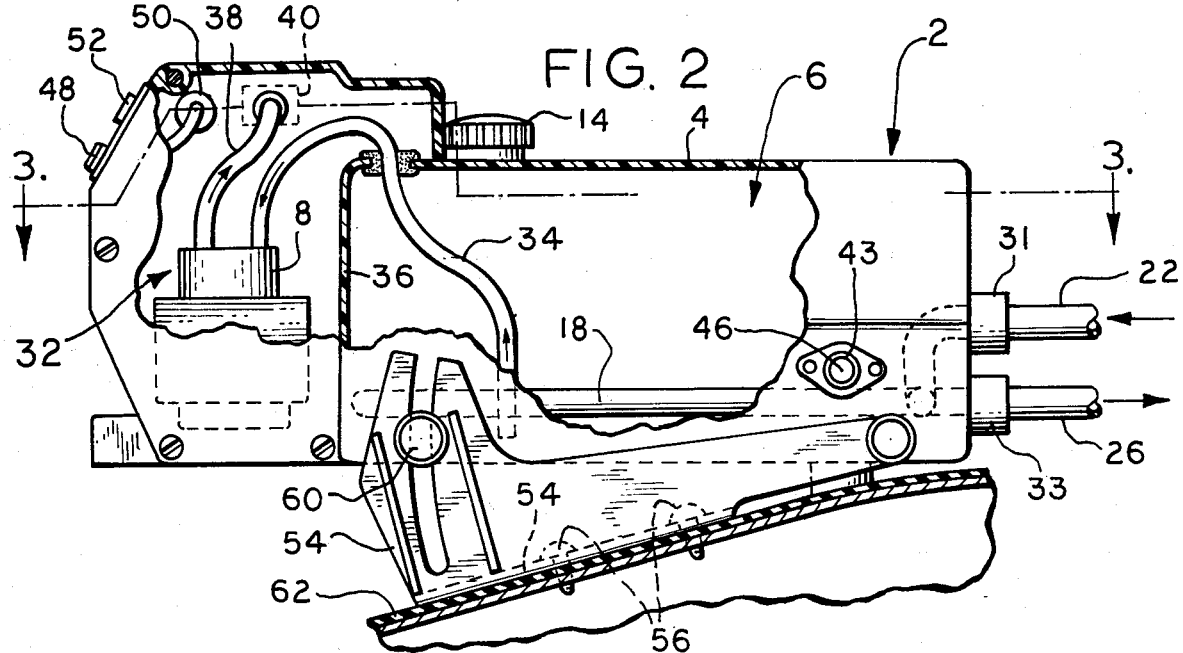
FIG. 2 is a side elevation view of the vehicle liquid dispenser, partially broken away in cross-section.
Figure 3:
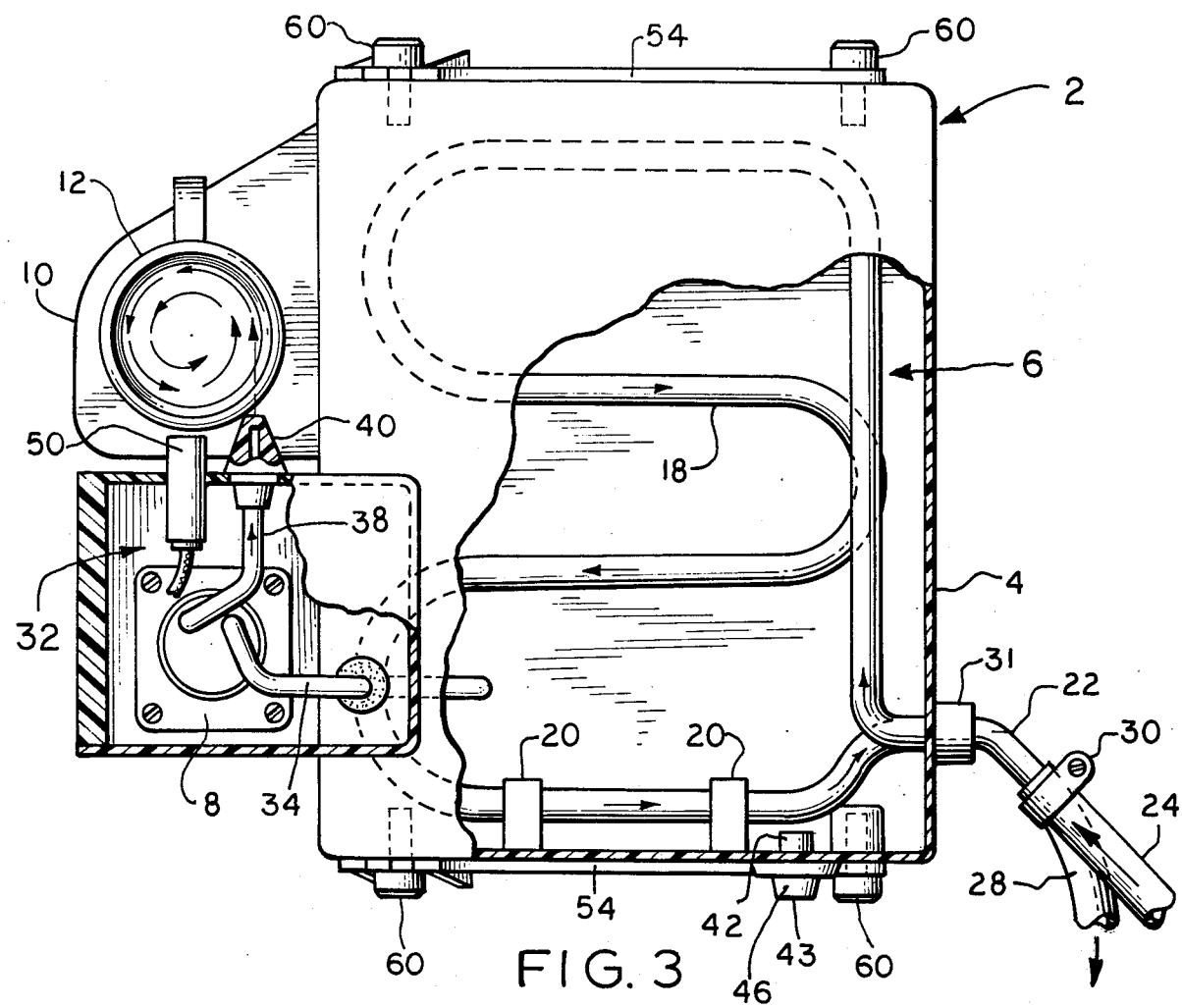
FIG. 3 is a cross-sectional view of the vehicle liquid dispenser taken along line 3—3 of FIG. 2.

One preferred embodiment of this invention is illustrated in FIGS. 1-3. In those figures, the hot liquid dispenser is generally indicated by reference numeral 2. Liquid dispenser 2 has a housing 4, a portion of which forms and encloses liquid storage tank 6. Another portion of housing 4 forms compartment 32 which encloses an electric pump 8. In the preferred embodiment shown, housing 4 has a shelf 10 to support cup 12 and is also provided with switches, a ready light and other features which will be described below. Preferably, housing 4 is made of plastic.

Liquid storage tank 6 occupies essentially the entire rear portion of liquid dispenser 2. It is provided with a fill cap 14 located on the top of the housing which permits easy liquid refilling. The storage tank is advantageously provided with a drain plug 16 located at the bottom of the storage tank along one of the sides in order to permit complete draining of the liquid so that the tank may be filled with entirely fresh liquid without removing the entire device from the vehicle.

The storage tank is primarily intended to be filled with water. However, other liquids may be used as well as completely prepared beverages such as coffee, tea, chocolate drink or the like.

Located within storage tank 6 is a heating coil or element 18 which has a U-shaped configuration. This heating element is a hollow tube preferably made of copper. The heating element 18 is located in the lower portion of storage tank 6 and is held in place by a number of clamps 20 which are molded into the walls of the storage tank. The lower portion of storage tank 6 is the preferred location for heating element 18 so that the heating element can always be kept immersed in the liquid and so that it is not necessary to keep the storage tank completely filled with liquid.

Engine coolant which is used to heat the stored liquid enters heating element 18 via coolant inlet 22 which is advantageously connected via inlet coolant hose 24 to the coolant line which supplies coolant to the vehicle's heater. This coolant supply is normally taken from the coolant that has been heated in the engine prior to being cooled in the radiator. After passing through heating element 18 and thus heating the liquid contained in storage tank 6, the engine coolant exits element 18 at coolant outlet 26 and returns to the cooling system via outlet coolant hose 28 which returns the coolant to the engine radiator. Clamps 30 are used to hold inlet coolant hose 24 and outlet coolant hose 28 over the ends of coolant inlet 22 and coolant outlet 26. Advantageously, O-ring seals are provided at couplings 31 and 33 where coolant inlet 22 and coolant outlet 26 pass through the wall of housing 4 to prevent leakage from storage tank 6.

Figure 5:
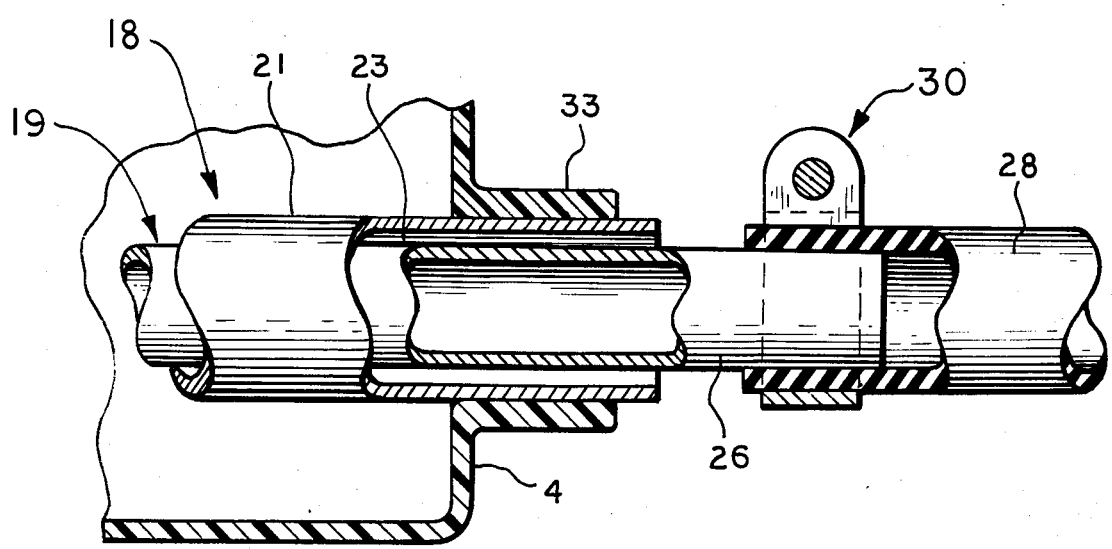
FIG. 5 is an enlarged cross-sectional view of a preferred heating coil arrangement useful in the dispenser of this invention.

As shown in FIG. 5, heating coil 18 is preferably constructed of two co-axial tubes. The engine coolant passes through the inner tube 19 which is connected to the coolant hoses by clamps 30. Outer tube 21 surrounds inner tube 19 and is separated from it by a very small air gap 23 which is not large enough to significantly alter heat transfer. Outer tube 21 is not connected to the hoses but extends only slightly beyond the couplings 31 and 33. This arrangement helps insure that any coolant leakage from inner tube 19 will drain to outside the dispenser unit and not be a source of contamination for the liquid in the tank.

Advantageously, hot coolant from the engine cooling system is continuously circulated through heating element 18 whenever the engine is running. This provides continual heating of the liquid in storage tank 6 and results in liquid usually being available for immediate dispensing except when the engine itself is cold. Alternatively, controls can be provided which permit the engine coolant to pass through heating element 18 only when the liquid needs to be heated.

A separate compartment 32 is provided in housing 4 to enclose pump 8 which is advantageously a self-priming electrically driven pump. The pump is supplied with liquid by pump inlet tube 34 which passes through wall 36 which separates liquid storage tank 6 from pump compartment 32. Preferably, pump inlet tube 34 withdraws liquid from storage tank 6 near the bottom and at or below the level at which heating element 18 is located. This will insure that the hottest liquid is always being dispensed.

After being withdrawn from storage tank 6 and passing through pump 8, the hot liquid passes through pump discharge tube 38 and enters cup 12 via discharge nozzle 40. As shown in FIG. 3, discharge nozzle 40 is preferably offset from the center of cup 12 so that the liquid is not discharged into the middle of the cup. This arrangement is particularly advantageous when a tapered cup is used such as cup 12 as shown in the drawings. The angle of discharge into such a tapered cup from the offset discharge nozzle is tangent to the cup and a vortex is formed which acts as a stirring agent for any beverage-making ingredients already in the cup.

In the particular embodiment illustrated, a thermal sensor 42 is located along one side of the housing within a protective dust cover 43. This sensor may alternatively be located along the back of the housing. This sensor extends through housing 4 into liquid storage tank 6. Its primary function is to automatically determine the temperature of the liquid and provide notice that the liquid in the tank is at or above the preset, minimum acceptable dispensing temperature. This notification may conveniently be provided by ready light 44 which is connected by an electrical circuit to thermal sensor 42. This ready light is illuminated when thermal sensor switch 46 (associated with thermal sensor 42) closes when the liquid temperature is at or above the preset, minimum dispensing temperature, normally about 140° F.

Thermal sensor 42 is also advantageously connected to the circuit providing power for electric pump 8 to render pump 8 inoperative when thermal sensor switch 46 is open due to the liquid temperature being below the minimum preset dispensing temperature. This arrangement prevents the liquid from being dispensed before warm enough liquid is available to properly prepare a hot beverage.

Figure 4:
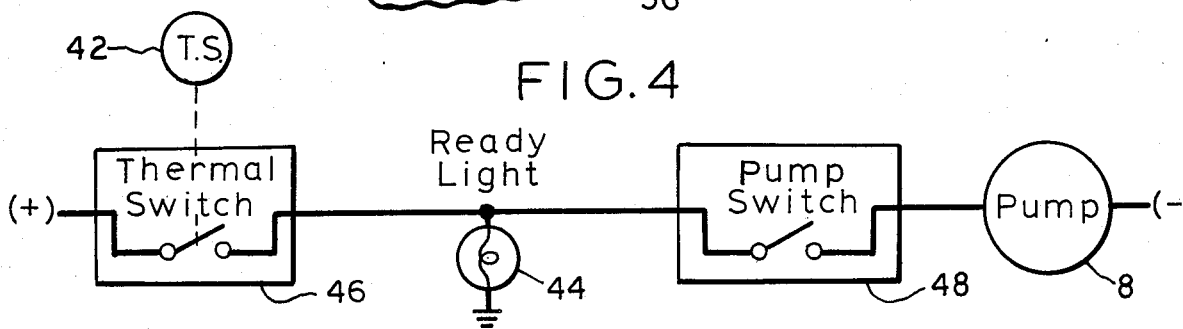
FIG. 4 is a schematic of the control circuit associated with the thermal sensor and pump.

A preferred circuit arrangement to interconnect pump 8 and thermal sensor 42 is shown in FIG. 4. The electrical power source for the entire dispensing device 2 including pump 8 and sensor 42 is the normal power source for the electrical accessories located in the passenger compartment. This power source is connected to dispensing device 2 at the fuse box provided in the passenger compartment. As indicated in FIG. 4, thermal sensor switch 46 is connected in series with ready light 44 and pump switch 48 which controls the operation of pump 8. When the liquid is below the minimum acceptable dispensing temperature, thermal sensor switch 46 is open, thus preventing illumination of ready light 44 and the operation of pump 8 with the pump switch 48. When the liquid is at or above the minimum dispensing temperature, thermal sensor switch 46 is closed, illuminating ready light 44 and rendering pump switch 48 operative. Preferably, pump switch 48 is a fail-safe on-off switch; that is, it must be held in the "on" position to keep pump 8 operating.

Thermal sensor switch 46 may also be used to activate external controls for regulating or shutting off the flow of engine coolant to heating element 18 which will thereby provide more accurate temperature control of the liquid in tank 6.

A courtesy light 50 for the dispensing area is also included in the preferred embodiment illustrated. This light is controlled by light switch 52 which is wholly independent of the thermal sensor, pump control circuit described above. This light provides added convenience and safety at night when the interior of the vehicle is dark.

The preferred embodiment shown also includes a movable bracket 54 which permits attachment of the dispenser to the floor or other surface of the vehicle via screws 56. Bracket 54 also permits leveling of the liquid dispenser in instances where the vehicle has a contoured transmission housing such as is shown by reference numeral 62 in FIG. 2. This bracket is adjustable via thumb screws 60 located on each side of housing 2.

In another preferred embodiment, not shown, the liquid storage tank can be segmented so that only a portion of the liquid is exposed to the heating element. This permits quicker availability of sufficiently hot liquid after cold engine start-up as only a portion of the total liquid is being heated. One means of accomplishing this is to divide the storage tank into a bottom portion containing the heating element and a top, unheated portion. If these two compartments are connected by a level controlled check valve, the bottom portion can always be kept at a level where a few cups of hot liquid are available, even shortly after cold engine start-up in the winter when the entire volume of liquid may initially be frozen.

In the preferred embodiment illustrated in FIG. 1, cup 12 can be set on shelf 10 which is conveniently provided with a recess 58 molded into the shelf to receive the bottom of cup 12. This provides stability to cup 12 during operation of the vehicle over rough roads and during acceleration and deceleration.

In the preferred embodiment described above, the liquid dispenser is not provided with either an ingredient dispenser or an internal brewing capability. Both of these have been excluded from the preferred dispenser embodiment in order to provide a compact, low cost dispensing unit. Instant, powdered coffee, tea, chocolate and the like are so widely available that it is no longer necessary to provide an internal brewing capability. Depositing powdered coffee, etc., directly into the cup from a jar, container or individual packets kept in the vehicle is not so burdensome that an ingredient dispenser is essential.

However, an ingredient dispenser may be added to the liquid dispenser of this invention and can be conveniently located on the housing above the water storage tank so that ingredients can be directly deposited into the cup. This ingredient dispenser may contain and dispense one or more instant or concentrated beverages such as coffee, tea, chocolate, etc.

Liquid dispensers for vehicles within the scope of this invention may also be adapted to dispense cold beverages such as iced tea, iced coffee, lemonade, and the like. The source of refrigerant for liquid cooling is preferably the air conditioner installed in the vehicle. Heating element 18 may be used as a cooling element or a second heat exchanging element may be added to the tank. If the liquid dispenser is adapted for both heating and cooling liquids, on-off controls should be provided on both the engine coolant and refrigerant feed lines so that they are not circulated through the liquid dispenser except when needed. The thermal sensor and related circuitry described above with regard to dispensing hot liquids may be readily adapted to perform comparable functions for cold liquid dispensing.

The embodiments described herein are intended to be exemplary of the types of liquid dispensers for motor vehicles which fall within the scope of this invention. However, one skilled in the art would certainly be expected to be able to make modifications and variations of these preferred embodiments without departing from the spirit and scope of the invention as defined in the following claims.

We claim:

1. A hot liquid dispenser for use in a motor vehicle having a liquid cooled engine, comprising: a unitary housing; a liquid storage tank within the housing; a heating coil within the storage tank having inner and outer co-axial tubes, the ends of the inner tube extending through the outer walls of the storage tank and the housing for connection with the engine's liquid cooling system for heating the stored liquid with a portion of the coolant, the outer tube being spaced from the inner tube by a small annular air gap, the ends of the outer tube extending outside the storage tank and the housing to provide a means for draining any coolant that might leak through the inner tube; an electric pump within the housing having an inlet tube extending into the lower portion of the storage tank and an outlet tube extending out of the housing for dispensing liquid from the storage tank; a thermal sensor extending into the lower portion of the storage tank to automatically determine if the liquid within the tank is at or above a minimum preset acceptable dispensing temperature substantially below the liquid's boiling point; a thermal sensor switch coupled with the thermal sensor, the switch being electrically connected in series between the pump and an external electrical power supply to prevent the stored liquid from being dispensed unless the liquid is at or above the preset minimum acceptable dispensing temperature; and a means attached to the housing for mounting the dispenser in the vehicle's passenger compartment.

2. The hot liquid dispenser of claim 1, wherein an indicator light is electrically connected in series between the thermal sensor switch and the electric pump to indicate when the liquid in the storage tank is at or above the minimum acceptable dispensing temperature.

3. A hot liquid dispenser for use in the passenger compartment of a motor vehicle having a liquid coolant engine cooling system, comprising:
   a unitary housing;
   a liquid storage tank within the housing;
   a tubular heating coil within the lower portion of the storage tank for heating the stored liquid with coolant from the engine cooling system, the heating coil having an inner tube, the ends of which extend beyond the housing for coupling with the engine cooling system to deliver coolant through the inner tube, and an outer co-axial tube spaced apart from the inner tube to separate the liquid in the tank from the inner tube and the coolant, the ends of the outer tube extending beyond the housing to drain any coolant that might leak through the inner tube away from the storage tank;
   an electric pump within the housing for dispensing hot liquid from the storage tank, the pump having an inlet tube extending into the lower portion of the storage tank to deliver liquid to the pump and an outlet tube extending out of the housing; and
   a thermal sensor switch having a thermal sensor extending into the lower portion of the storage tank to automatically determine if the liquid within the tank is at or above a preset minimum dispensing temperature substantially below the liquid's boiling point, the switch being electrically connected in series between the pump and an external power supply to prevent the stored liquid from being dispensed unless the liquid is at or above the minimum dispensing temperature.

4. A device, for use in the passenger compartment of a motor vehicle having a liquid coolant engine cooling system, which device dispenses a potable hot liquid above a preset minimum dispensing temperature substantially below the boiling point of the liquid, comprising:
   a unitary housing;
   a cup shelf extending from the housing for supporting a cup to receive liquid dispensed by the device;
   a liquid storage tank formed within and partially by the housing;
   a tubular heating coil positioned within the lower portion of the storage tank for heating the stored liquid with coolant from the engine cooling system, the heating coil having an inner tube, the ends of which extend beyond the housing for connection to the engine cooling system to permit coolant to pass through the inner tube and a co-axial outer tube separated from the inner tube by a small air gap to separate the potable liquid in the tank from the inner tube and the coolant within the inner tube, the ends of the outer tube extending slightly beyond the housing to provide a means for draining any coolant that might leak through the inner tube;
   an electric pump within the housing for dispensing hot liquid from the storage tank, the pump having a liquid inlet tube extending into the lower portion of the storage tank and a liquid outlet tube extending out of the housing to deliver liquid to a cup supported on the cup shelf;
   a manually operable pump switch within said housing electrically connected between the pump and an external power supply;
   a thermal sensor switch within said housing having a thermal sensor extending into the lower portion of the storage tank to automatically determine if the liquid within the tank is above the preset minimum dispensing temperature, the thermal switch being electrically connected in series between the pump switch and the external power supply to prevent electrical energy from being supplied to the pump switch if the liquid is not above the minimum dispensing temperature, so that stored liquid cannot be dispensed unless the liquid is above said temperature;
   a ready light within the housing electrically connected in series between the thermal switch and the pump switch to indicate when the liquid in the storage tank is above the minimum dispensing temperature and the pump is energized for delivery of hot liquid; and
   a mounting means attached to the housing for mounting the device on the transmission hump in the vehicle's passenger compartment.

5. The dispensing device of claim 4, wherein the cup shelf has a recess to receive the lower rim of a cup and the pump's outlet tube is offset with respect to a cup positioned in the recess so that a vortex is formed during the delivery of liquid into the cup which aids in stirring solid beverage making ingredients already in the cup.

* * * * *